No. 895,223. PATENTED AUG. 4, 1908.
J. W. ALLISON.
WINDOW CLEANING DEVICE.
APPLICATION FILED FEB. 26, 1908.
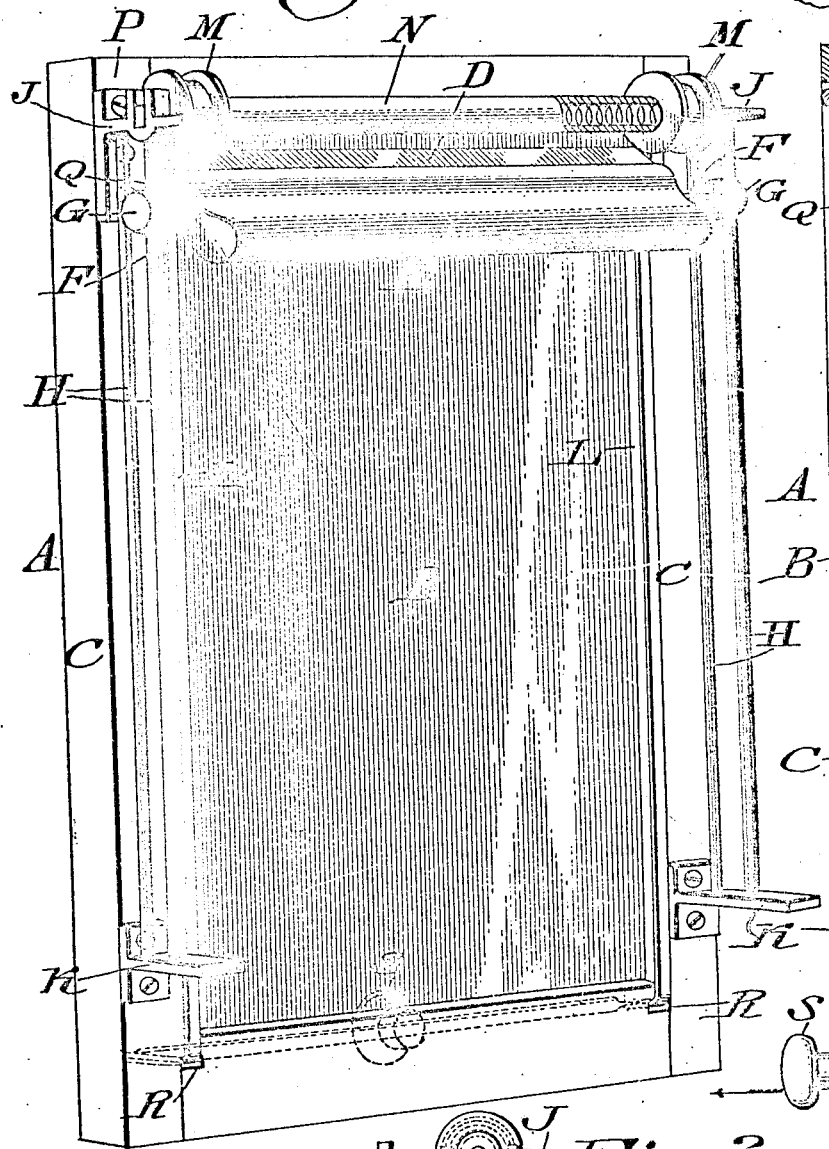
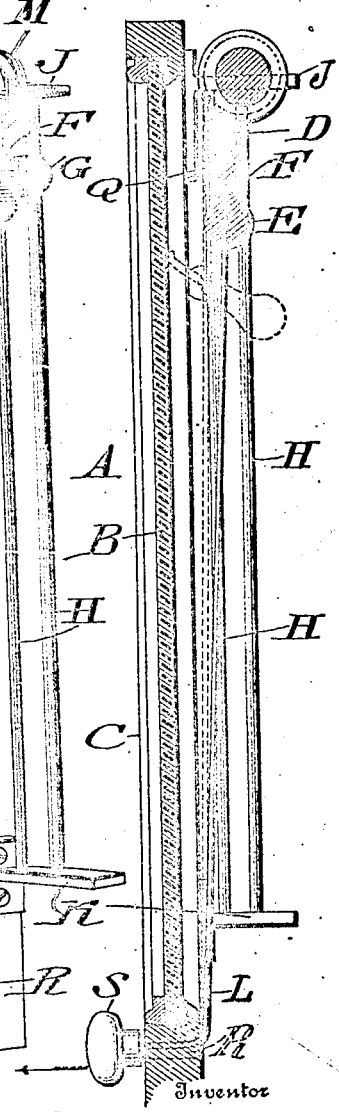
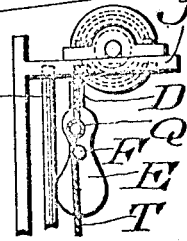

UNITED STATES PATENT OFFICE.

JOHN W. ALLISON, OF NEW YORK, N. Y.

WINDOW-CLEANING DEVICE.

No. 895,223.

Specification of Letters Patent.

Patented Aug. 4, 1908.

Application filed February 26, 1908. Serial No. 417,840.

*To all whom it may concern:*

Be it known that I, JOHN W. ALLISON, a citizen of the United States, residing in the city, county, and State of New York, have invented a new and useful Window-Cleaning Device, of which the following is a specification.

My invention consists of a device for cleaning the outside of a window from within the place of location of the window, the same embodying a brush or wiper, means for presenting the latter to the glass, while being held in contact therewith, and means for operating the brush from the opposite side of the glass.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a form of a window cleaning device embodying the invention. Fig. 2 represents a vertical section thereof. Fig. 3 represents a side elevation of a portion of modified form.

Similar letters of reference indicate corresponding parts in the figures.

Referring to the drawing:—A designates a window, which is composed of a pane of glass B and the frame C, to which the same is attached in usual manner. In the present case said window is that of an automobile or other vehicle, the glass being liable to be splashed or coated in front or outside with dirt, dust, etc., access to which is inconvenient from within the vehicle.

In carrying out my invention, I employ a brush, which is located in front of the glass, and composed of a strip D of soft rubber or other suitable material and the gravitating head E, whose upper end carries said strip and which has connected with its sides the gudgeons or axes F, whose bearings are on the blocks G, the sides of which are grooved and adapted to slide in vertical direction on the guide rods H, whose ends are connected with brackets J, K respectively on the upper and lower portions of the frame C.

L designates straps, of tape or other pliable material, whose upper ends are adapted to be wound on and unwound from the pulleys M on the spring roller N of the order of a shade fixture, the bearings P of said pulleys being on the upper brackets J, said straps being continued downwardly and connected with the pins Q on the sides of the head E above the axes F of the latter, the straps also extending downwardly from said pins to the bottom of the frame C after which they pass through the openings R in the side of the frame to the rear of the frame, where they are joined by the operating knob or button S, whereby both straps L may be simultaneously drawn or operated from the rear of the window.

In Fig. 3, I show a cord T in lieu of a piece of tape, said cord being connected with the side of the head E, as at Q, and producing the same results as said piece of tape.

The operation is as follows:—When the front of the glass is soiled from any cause, it may be cleansed from the back thereof, which is within the vehicle. For this purpose, the straps L are drawn rearward by the button or knob S, whereby the brush is lowered and owing to the connection of the straps with the head E, the connection being eccentric, the upper limb or portion of the head E is turned on its axis inwardly towards the glass, carrying with it the strip D and pressing it firmly against said glass, see Fig. 1. As said strip is lowered by the straps, it remains in contact with the glass and acts as a wiper to brush and cleanse the same, it being evident that the straps are unwound from the pulleys M, as the brush descends. When the knob S is let-go, the spring roller N rotates in reverse order and so rewinds the straps on the pulleys and raises the brush, the head E owing to its gravitating nature returning to its normal position and removing the strip D from the glass, see Fig. 2, after which the operations may be repeated.

In some cases, it may be desirable to set the spring roller further from the frame C. In this case, the brackets J, K are each formed of separate parts for connecting them, and furthermore provided with a series of openings to adapt the guide rods H to be placed in adjustment relatively to the position of said roller.

Having thus described my invention, what I claim as new and desire to secure by Letters Patent, is:—

1. In a window cleaner, a spring roller a support for the bearings thereof, a gravitating head having lateral axes, a wiper on said head, rollers on said axes, guides for said rollers, and pliable means passed over the spring roller and having one end connected with the ends of said head above said axes and the other ends passed downwardly therefrom.

2. In a window cleaner, a spring roller, a gravitating head having lateral axes, rollers on said axes, guides for said rollers, pliable means passed over the spring roller and having one end connected with the ends of said head above said axes and the other ends passed downwardly, and brackets for supporting the bearings of said spring roller.

3. In a window cleaner, a spring roller, a gravitating head having lateral axes, rollers on said axes, guides for said rollers, pliable means passed over the spring roller and having one end connected with the ends of said head above said axes and the other ends passed downwardly therefrom, and adjustable brackets for supporting the bearings of said spring roller, said guide rods being adjustably mounted.

4. In a window cleaner, the combination with the frame and brackets secured near the upper end thereof, and brackets on the frame near the lower end thereof, of vertical guide rods mounted in said upper and lower brackets, a spring roller having its bearings mounted in the upper brackets, a head having lateral axes at its ends, said head being enlarged below its axes, whereby it automatically assumes a vertical position, rollers on said axes guided on said rods, lateral pins on said head above said axes, and pliable members passed over pulleys on said spring roller with one end of each connected to said pins and the other ends extended downwardly therefrom.

JOHN W. ALLISON.

Witnesses:
JOHN A. WIEDERSHEIM,
HARRY C. DALTON,